US006922438B1

(12) United States Patent
Eidson

(10) Patent No.: US 6,922,438 B1
(45) Date of Patent: Jul. 26, 2005

(54) SYSTEM FOR MPSK SYMBOL HYPOTHESIS TESTING

(75) Inventor: Donald Brian Eidson, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 749 days.

(21) Appl. No.: 09/815,149

(22) Filed: Mar. 22, 2001

Related U.S. Application Data
(60) Provisional application No. 60/255,757, filed on Dec. 15, 2000.

(51) Int. Cl.[7] .............................................. H04Q 1/20
(52) U.S. Cl. ...................... 375/224; 375/329; 375/279; 370/215
(58) Field of Search ............................... 375/347, 142, 375/346, 262, 340, 280, 279, 224, 344, 353, 285, 148, 150, 342, 365, 130, 316, 329; 708/300, 625; 714/792, 795; 370/215, 253, 342; 329/307, 308

(56) References Cited

U.S. PATENT DOCUMENTS

| | | | | |
|---|---|---|---|---|
| 4,104,729 | A | * | 8/1978 | Gingell ........................ 708/625 |
| 5,349,609 | A | * | 9/1994 | Tsujimoto .................... 375/347 |
| 6,421,400 | B1 | * | 7/2002 | Rhee et al. .................. 375/329 |
| 6,570,910 | B1 | * | 5/2003 | Bottomley et al. ......... 375/148 |
| 6,608,874 | B1 | * | 8/2003 | Beidas et al. ............... 375/353 |

OTHER PUBLICATIONS

Sklar, Bernard (p. 92–94, Digital communication, TK5103.7.S55, 1998 by P T R Prentice Hall, Prentice–Hall Inc.).*

Bahl, L. R., et al., *Optimal Decoding of Linear Codes for Minimizing Symbol Error Rate*; IEEE Transactions on Information Theory, Mar. 1974, pp. 284–287.

Benedetto, S., et al., *A Soft–Input Soft–Output Maximum A Posteriori (MAP) Module to Decode Parallel and Serial Concatenated Codes*; TDA Progress Report, 42–127, Nov. 1996, pp. 1–20.

Berrou, Claude, et al., *Near Shannon Limit Error —Correcting Coding and Decoding: Turbo–Codes (1)*; IEEE, 1993, pp. 1064–1070.

Divsalar, D. and Pollara, F., *Turbo Trellis Coded Modulation with Iterative Decoding for Mobile Satellite Communications*; Jet Propulsion Laboratory, California Institute of Technology, pp. 1–7.

Robertson, Patrick et al.; *A Comparison of Optimal and Sub–Optimal MAP Decoding Algorithms Operating in the Log Domain*; Proc. IC '95 Seattle, WA 1995; IEEE pp. 1009–1013.

Viterbi, Andrew J., *An Intuitive Justification and a Simplified Implementation of the MAP Decoder for Convolutional Codes*; IEEE Journal on Selected Areas in Communications, vol. 16, No. 2, Feb. 1998, pp. 260–264.

* cited by examiner

Primary Examiner—Shuwang Liu
Assistant Examiner—Ted Wang
(74) Attorney, Agent, or Firm—Howrey Simon Arnold & White LLP

(57) ABSTRACT

A system for MPSK symbol hypothesis testing. A received symbol having in-phase (I) and quadrature (Q) components is input to the system. Multipliers for each of the components are determined corresponding to the MPSK symbol hypothesis s being tested. The symbol s is a quadrature symbol having in-phase and quadrature components, $s_I$ and $s_Q$, respectively. The multipliers are each derived from fractions which approximate to a desired level of resolution either $\pm s_I$ or $\pm s_Q$. The system multiplies the I and Q components by their respective multipliers through a discrete series of add, shift, and twos complement operations. It then derives a metric for testing the hypothesis from the resulting products.

43 Claims, 10 Drawing Sheets

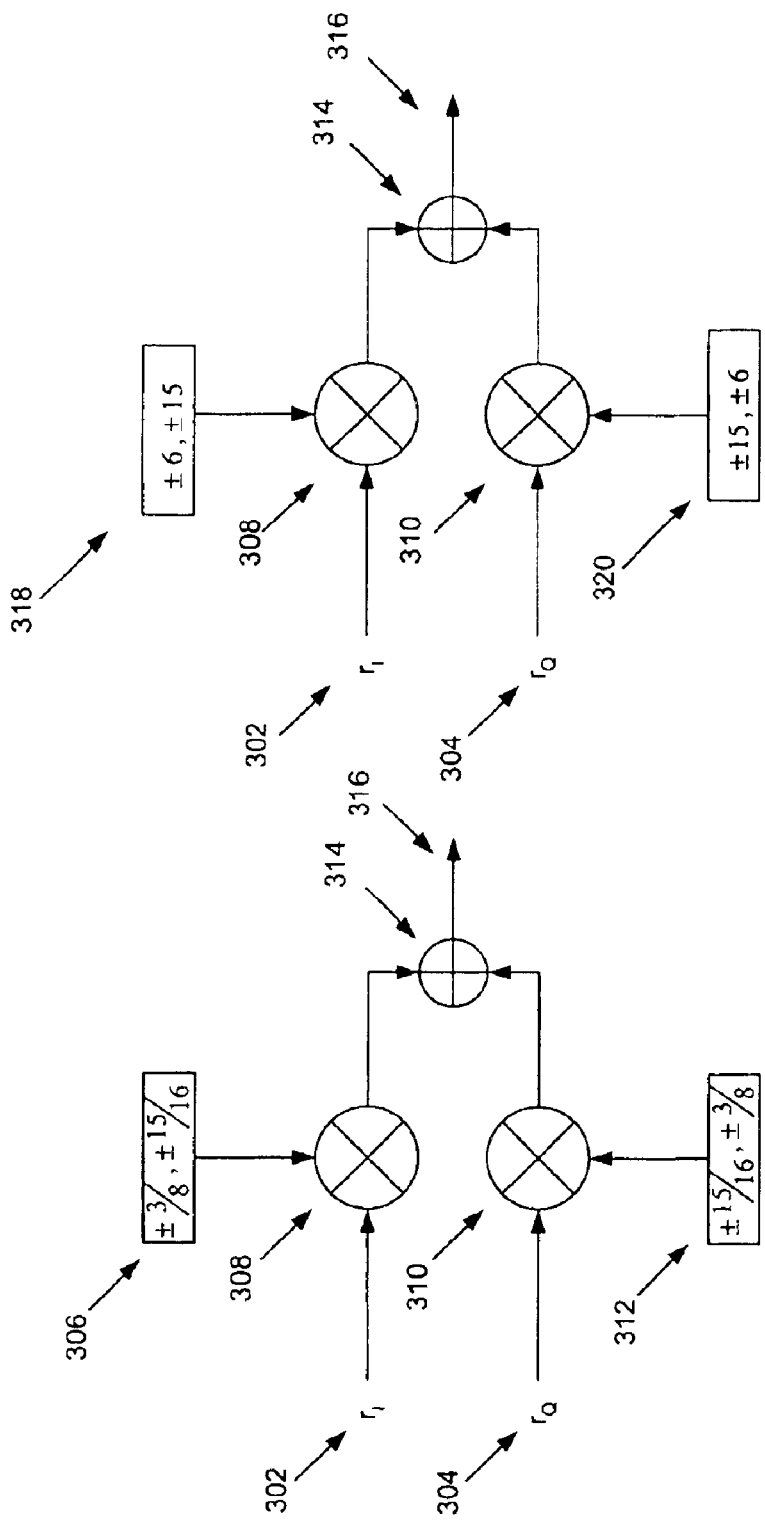

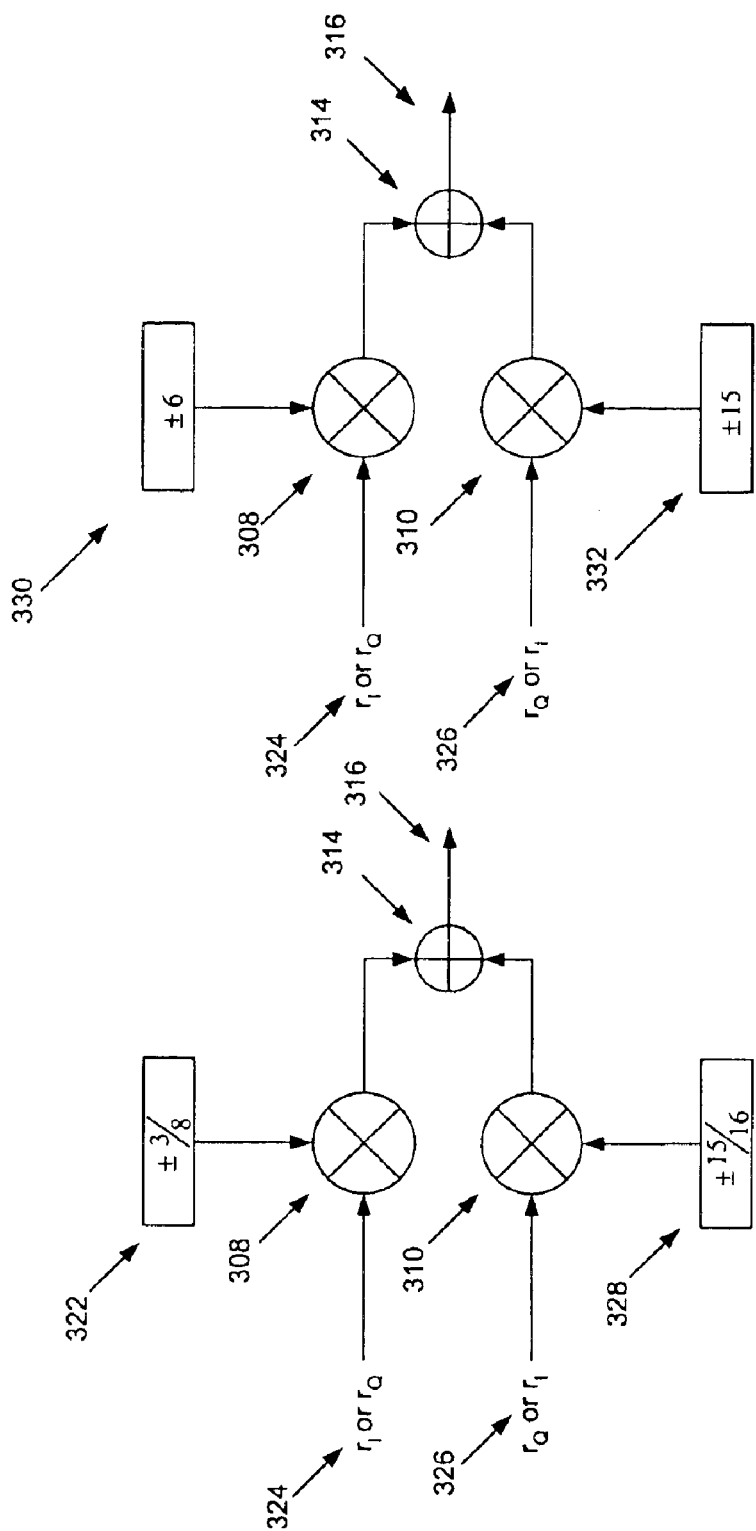

SYSTEM FOR MPSK SYMBOL HYPOTHESIS TESTING

This application claims the benefit of U.S. Provisional Application Ser. No. 60/255,757, filed Dec. 15, 2000, which is hereby fully incorporated by reference herein as though set forth in full.

BACKGROUND OF THE INVENTION

1. Field of the Invention

This invention relates to MPSK symbol hypothesis testing, and, more specifically, to metrics for performing MPSK symbol hypothesis testing, and systems and methods for providing the metrics.

2. Related Art

An MPSK symbol constellation is a constellation of M possible symbols arranged around a unit circle on the quadrature (I-Q) plane. The value M is a power of two and can be expressed as $M=2^P$. In a transmitter employing an MPSK symbol constellation, a bit to symbol mapper maps successive renderings of p bits into one of the symbols, a modulator modulates a carrier signal with the I and Q values associated with that symbol, and an antenna transmits the signal. In a receiver employing the MPSK symbol constellation, an antenna receives the signal, and a demodulator demodulates the carrier signal to baseband I and Q values. The demodulator or a downstream decoder may then perform hypothesis testing on the received symbols represented by the baseband I and Q values in order to estimate the MPSK symbols that were transmitted.

A conventional approach for performing MPSK symbol hypothesis testing is through a look up table containing entries for all possible hypotheses for all possible received symbols. For a given received symbol, a metric for a particular hypothesis is obtained by performing an access to the lookup table. Multiple accesses may be performed for each of the possible hypotheses. The metrics may then be analyzed to estimate the symbol corresponding to the most likely hypothesis.

A problem with the conventional approach is that, in certain applications, the amount of memory required may be prohibitive. Consider, for example, an application in which received symbols are represented through 8 bits of resolution, and the symbol constellation is an 8-PSK symbol constellation in which 8 hypotheses are possible for each received symbol. In this application, a lookup table with $2^{11}$ entries would be required. However, space and cost constraints might not permit a lookup table of this size.

SUMMARY

A system for MPSK symbol hypothesis testing is provided by the invention. A received symbol having in-phase (I) and quadrature (Q) components is input to the system. A demodulator may derotate the symbols to achieve proper orientation of the symbol constellation. Multipliers for each of the components are determined corresponding to the MPSK symbol hypothesis being tested. The multipliers are each derived from fractional values which approximate to a desired level of resolution the I and Q values of the symbol hypothesis being tested. The system multiplies the I and Q components by their respective multipliers, and adds the resulting products to form a number from which a metric for testing the hypothesis is derived. Preferably, the multipliers are such that the multiplications can be performed through a discrete series of shift, add, and twos complement operations.

In one embodiment, the symbol constellation is an 8-PSK symbol constellation oriented such that all the symbols are off an I or Q axis by 22.5°. In this embodiment, the multipliers are each equal to either $\pm 15/16$ or $\pm 3/8$. A multiplication by $15/16$ in this embodiment may be performed by shifting the multiplicand (either the I or Q component of the received symbol) four places to the right and adding the shifted value to the unshifted multiplicand. A multiplication by $-15/16$ in this embodiment may be performed by performing the foregoing two steps and then taking the twos complement of the result.

A multiplication by $3/8$ in this embodiment may be performed by shifting the multiplicand (again, either the I or Q component of the received symbol) two places to the right, shifting the multiplicand one place to the right, and adding the two shifted multiplicands. A multiplication by $-3/8$ may be performed by performing the foregoing two steps and then taking the twos complement of the result.

Note that the multiplications in this embodiment may introduce rounding error as bits may be lost due to the shift right operations, and that this problem may be eliminated by padding each of the multiplicands by 4 bits on the right.

In a second embodiment, designed to avoid rounding error without the need to pad each of the multiplicands, the multipliers are each either $\pm 15$ or $\pm 6$. These values are derived from $\pm 15/16$, $\pm 3/8$ by multiplying these values by the common factor 16. To account for this, the rightmost bit of each of the multiplicands is interpreted to be the $2^{-4}$ position rather than the $2^0$ position. In effect, a multiplication of each of the multipliers by 16 is counterbalanced by dividing each of the multiplicands by 16.

A multiplication by 15 in this embodiment may be performed by shifting the multiplicand (either the I or Q component of the received symbol) four places to the left and adding the shifted value to the twos complement of the multiplicand. A multiplication by $-15$ may be performed by performing the foregoing two steps and then taking the twos complement of the result.

A multiplication by 6 in this embodiment may be performed by shifting the multiplicand (again, either the I or Q component of the received symbol) two places to the left, shifting the multiplicand one place to the left, and adding the two shifted multiplicands. A multiplication by $-6$ may be performed by performing the foregoing two steps and then taking the twos complement of the result.

Note that, in this embodiment, the multiplications do not introduce rounding error and right padding is unnecessary since all the shifting operations are left shift operations. Moreover, left padding is unnecessary by interpreting the rightmost bit of each multiplicand to be the $2^{-4}$ position rather than the $2^0$ position.

Consequently, a system is provided for testing an 8-PSK symbol hypothesis in which multiplication is performed through a discrete number of addition, shifting, and twos complement operations.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIGS. 3A–3D are block diagrams of embodiments of a system according to the invention.

Figure 1:
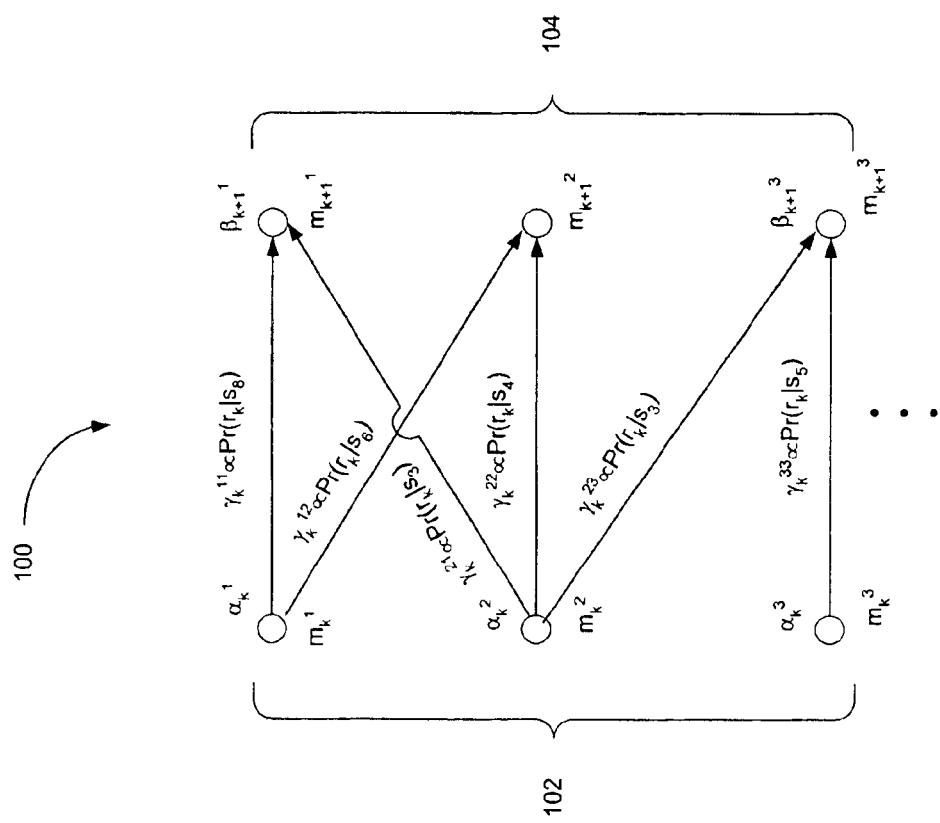
FIG. 1 illustrates a portion of a trellis representation with corresponding state and branch metrics indicated.

DETAILED DESCRIPTION
I. Example Application

In this section, for illustrative purposes only and without limiting effect, an example application of the invention will be described. However, it should be appreciated that many other applications of the invention are possible. In particular, although the example application here relates to computing a branch metric for use in a log-MAP decoder, it should be appreciated that the invention may be used with any trellis representation or any trellis decoder including, including without limitation, soft output decoders, Viterbi decoders, MAP decoders, log-MAP decoders, SOVA decoders, and MAX-log-MAP decoders. It should also be appreciated that the invention may be used in contexts other than computing metrics for use in decoders. One example is achieving synchronization between a transmitter and a receiver through detection of a known sync word comprising a plurality of MPSK symbols. In this application, the invention could be used to correlate the stream of incoming symbols with the sync word to thereby test for the presence of the sync word.

A trellis decoder utilizes a trellis representation in the decoding process. A trellis representation represents the states of a Markov process, which can be used to model the corresponding encoder, at discrete points in time. Branches between the states represent possible hypotheses about the code symbols that were transmitted or the underlying source bits. Examples of trellis decoders include maximum a posteriori (MAP) decoders, log-MAP decoders, Max-Log-Map decoders, Viterbi decoders, and Soft Output Viterbi (SOVA) decoders. For additional information, please see A, Viterbi, "An Intuitive Justification and a Simplified Implementation of the MAP Decoder for Convolutional Codes," IEEE Journal On Selected Areas In Communications, Vol. 16, No. 2, February 1998, pp. 260–264; S. Benedetto et al., "A Soft-Input Soft-Output Maximum A Posteriori (MAP) Module to Decode Parallel and Serial Concatenated Codes," TDA Progress Report 42–127, Nov. 15, 1996, pp. 1–20; D. Divsalar et al., "Turbo Trellis Coded Modulation with Iterative Decoding for Mobile Satellite Communications," Proc. Int. Mobile Satellite Conf, June 1997; "A Comparison of Optimal and Sub-Optimal MAP Decoding Algorithms Operating in the Log Domain," Proc. IC '95, Seattle, Wash. 1995, pp. 1009–1013; C. Berrou et al., "Near Shannon Limit Error-Correcting Coding And Decoding: Turbo-Codes," Proc. IEEE Int. Conf. Commun., Geneva, Switzerland, 1993, pp. 1064–1070; L. R. Bahl et al., "Optimal Decoding of Linear Codes For Minimizing Symbol Error Rate," IEEE Trans. Inform. Theory, vol. IT-20, pp. 284–287, 1974, each of which is incorporated by reference herein as through set forth in fill.

During the decoding process, state metrics may be computed for each of the states in the trellis, and branch metrics may be computed for each of the transitions in the trellis. These metrics are used by the decoder to evaluate various hypotheses about the symbols that were transmitted or about the underlying source bits. In the log MAP decoding process, the group of hypotheses which maximizes the a posteriori probabilities is selected as the decoder output.

A portion 100 of a trellis representation is illustrated in FIG. 1. The trellis representation illustrates the states of an encoder and transitions between the states over discrete points in time. In FIG. 1, numeral 102 identifies the possible states of the encoder at time k, and numeral 104 identifies the possible states of the encoder at time k+1. In the particular example illustrated in FIG. 1, for illustrative purposes only and without any limiting effect, there are three possible states of the encoder illustrated at time k, $m_k^1$, $m_k^2$, and $m_k^3$, and three possible states of the encoder illustrated at time k+1, $m_{k+1}^1$, $m_{k+1}^2$, and $m_{k+1}^3$. The branches between the states represent possible hypotheses about the symbol that was transmitted at time k.

During the decoding process, state metrics are computed for each of the states in the trellis representation, and branch metrics are computed for each of the transitions between the states in the trellis representation.

In a log MAP decoding process, state metrics are computed recursively. Both forward state metrics and backward state metrics are computed. The forward state metrics are metrics which, for states at time k, are computed recursively based on the state metrics for time k−1. The backward state metrics are metrics which, for states at time k, are computed recursively based on the state metrics for time k+1. In FIG. 1, the forward state metrics for states $m_k^1$, $m_k^2$, and $m_k^3$ are respectively identified as $\alpha_k^1$, $\alpha_k^2$, and $\alpha_k^3$, and the backward state metrics for $m_{k+1}^1$, $m_{k+1}^2$, and $m_{k+1}^3$ are respectively identified as $\beta_{k+1}^1$, $\beta_{k+1}^2$, and $\beta_{k+1}^3$.

In FIG. 1, a branch metric for a transition between states m and m' at time k is referred to as $\gamma_k^{mm'}$. A branch metric at time k represents the conditional probability of the received symbol at time k, $r_k$, given the transmission of a hypothesized symbol $s_k$, at time k. Again, for illustrative purposes only and without limitation, the transitions illustrated (listed in order from top to bottom) are assumed to correspond respectively with the following hypothesized symbols: $s_8$, $s_6$, $s_3$, $s_4$, $s_3$, and $s_5$.

In the particular example illustrated in FIG. 1, the possible transitions between the states at time k and those at time k+1 comprise 1.) a transition between state 1 at time k and state 1 at time k+1, having a branch metric $\gamma_k^{11}$ representative of the conditional probability $\Pr(r_k|s_8)$; 2.) a transition between state 1 at time k and state 2 at time k+1, having a branch metric $\gamma_k^{12}$ representative of the conditional probability $\Pr(r_k|s_6)$; 3.) a transition between state 2 at time k and state 1 at time k+1, having a branch metric $\gamma_k^{21}$ representative of the conditional probability $\Pr(r_k|s_3)$; 4.) a transition between state 2 at time k and state 2 at time k+1, having a branch metric $\gamma_k^{22}$ representative of the conditional probability $\Pr(r_k|s_4)$; 5.) a transition between state 2 at time k and state 3 at time k+1, having a branch metric $\gamma_k^{23}$ representative of the conditional probability $\Pr(r_k|s_3)$; and 6.) a transition between state 3 at time k and state 3 at time k+1, having a branch metric $\gamma_k^{33}$ representative of the conditional probability $\Pr(r_k|s_5)$.

In a log-MAP decoder, the state and branch metrics are in the natural log domain. Therefore, with a log-MAP decoder, the joint probability of transitioning from a state m to a state m' at time k, $\lambda_k^{mm'}$, may be expressed $\alpha_k^m + \gamma_k^{mm'} + \beta_{k+1}^{m'}$.

Once these joint probabilities have been determined, a log-likelihood ratio function, $LLR_k$ may be determined in accordance with the following equation:

$$LLR_k = MAX^*_{\forall edges\ that\ imply\ release\ of\ 1}(\lambda_k^{mm'}) - MAX^*_{\forall edges\ that\ imply\ release\ of\ 0}(\lambda_k^{mm'}) \quad (1)$$

where the function MAX*(A,B) is defined to be:

$$MAX^*(A,B) = MAX(A,B) + ln(1 + exp(-|A-B|)) \quad (2)$$

This value may then be used to estimate the source bit at time k. If the value is greater than 0, the source bit is estimated to be a 1; if the value is less than 0, the source bit is estimated to be a 0.

II. Preferred Embodiments

A. Derivation of Metric

A metric sufficient for testing the hypothesis that a received symbol r resulted from transmitting a hypothesized MPSK symbol s over a communications channel may be represented by the following expression:

$$\frac{rs^* + r^*s}{\sigma^2} \quad (3)$$

where * indicates the complex conjugate operation, $\sigma^2$ is the variance of the noise introduced by transmission through the channel, and r and s are both quadrature symbols which may be represented by complex numbers.

To explain the derivation of this expression, we will start with the conditional probability of a real random variable and extend this to the case of a complex random variable.

Consider that the conditional probability of a real-valued received symbol r given a real-valued hypothesized symbol s can, assuming transmission occurs over an additive white Gaussian noise channel, be expressed as follows:

$$Pr(r|s) = \frac{1}{\sqrt{2\pi}\ \sigma} \exp\left(-\left(\frac{|r-s|^2}{2\sigma^2}\right)\right) \quad (4)$$

Since r and s are quadrature symbols, r can be expressed as the complex number $r_I + jr_Q$, where $r_I$ is the in-phase component of r, and $r_Q$ is the quadrature component of r, and s can be expressed as the complex number $s_I + js_Q$, where $s_I$ is the in-phase component of s, and $s_Q$ is the quadrature component of s. Since r and s are complex numbers, expression (4) is inapplicable.

However, r can be considered to be formed of a pair two independent random variables, the first being the in-phase component, and the second being the quadrature component. Since the joint probability density function of two independent random variables is given by the product of their respective probability density functions, the probability density function of r given s can be expressed as:

$$Pr(r|s) = Pr(r_I|s_I) \times Pr(r_Q|s_Q) \quad (5)$$

Since the noise added to the in-phase and quadrature components of r is considered to be Gaussian distributed, both $Pr(r_I|s_I)$ and $Pr(r_Q|s_Q)$ will be of the form of expression (4). Therefore, expression (5) can be re-expressed as follows:

$$Pr(r|s) = \frac{1}{2\pi\sigma_I\sigma_Q} \exp\left[\frac{-|r_I - s_I|^2}{2\sigma_I^2} + \frac{-|r_Q - s_Q|^2}{2\sigma_Q^2}\right] \quad (6)$$

where $\sigma_I^2$ is the variance of the noise added to the I component of transmitted symbol, and $\sigma_Q^2$ is the variance of the noise added to the Q component of the transmitted symbol.

Since $\sigma_I^2$ and $\sigma_Q^2$ can reasonably assumed to be equal, and also given that $\sigma^2 = \sigma_I^2 + \sigma_Q^2 = \sigma 2\sigma_I^2$, expression (6) can be re-expressed as follows:

$$Pr(r|s) = \frac{1}{\pi\sigma^2} \exp\frac{-1}{\sigma^2}[|r_I - s_I|^2 + |r_Q - s_Q|^2] \quad (7)$$

Since the natural logarithm is a monotonically increasing function of its argument, expression (7) can be put into the natural log domain with no loss of metric quality. In the natural log domain, this probability can be expressed as:

$$K - \frac{|r_I - s_I|^2 + |r_Q - s_Q|^2}{\sigma^2} \quad (8)$$

where K is the constant ln $$\left(\frac{1}{\pi\sigma^2}\right).$$

From the standpoint of determining a metric that may be useful for comparing different symbol hypotheses, the constant K is irrelevant and can be ignored. Thus, expression (8) can be simplified to:

$$-\frac{|r_I - s_I|^2 + |r_Q - s_Q|^2}{\sigma^2} \quad (9)$$

The numerator of expression (9) can be expanded to: $-(r_I^2 - 2r_I s_I + s_I^2 + r_Q^2 - 2r_Q s_Q + s_Q^2)$. In this expanded expression, the terms $r_I^2$ and $r_Q^2$ can be ignored since they will be the same regardless of symbol hypothesis. In addition, the terms $s_I^2$ and $s_Q^2$ can be ignored since, for an MPSK symbol constellation, where all the hypothesized symbols lie on the unit circle, the sum $s_I^2 + s_Q^2$ will always be 1.

Therefore, expression (9) can be even further simplified to:

$$\frac{2(r_I s_I + r_Q s_Q)}{\sigma^2} \quad (10)$$

The numerator of expression (10) can be re-stated as $rs^* + r^*s$. Substituting this for the numerator of expression (10), expression (3) set forth at the outset results.

In the case in which a MAX operation applies to select amongst the competing hypotheses, expression (10) can be further simplified to:

$$r_I s_I + r_Q s_Q \quad (11)$$

That is because MAX is a linear operation, and the constant $2/\sigma^2$ in expression (10) is irrelevant since $MAX(2A/\sigma^2, 2B/\sigma^2) = 2/\sigma^2 MAX(A, B)$. In a Viterbi decoder, the MAX operation is used to select amongst competing hypotheses. Therefore, for use in the Viterbi or MAX-log-MAP decoder, the metric of expression (11) is appropriate.

However, in the case in which a MAX* operation applies to select amongst the competing hypotheses, the $2/\sigma^2$ factor must be retained. That is because MAX* is a non-linear operation, and MAX*$(2A/\sigma^2, 2B/\sigma^2) \neq 2/\sigma^2$MAX*$(A, B)$. As discussed in the previous section, the MAX* operation is used to select amongst competing hypotheses in a log-MAP decoder. Therefore, for use in a log-MAP decoder, the metric of expressions (3) or (10) is appropriate.

B. An 8-PSK Symbol Constellation

Figure 2:
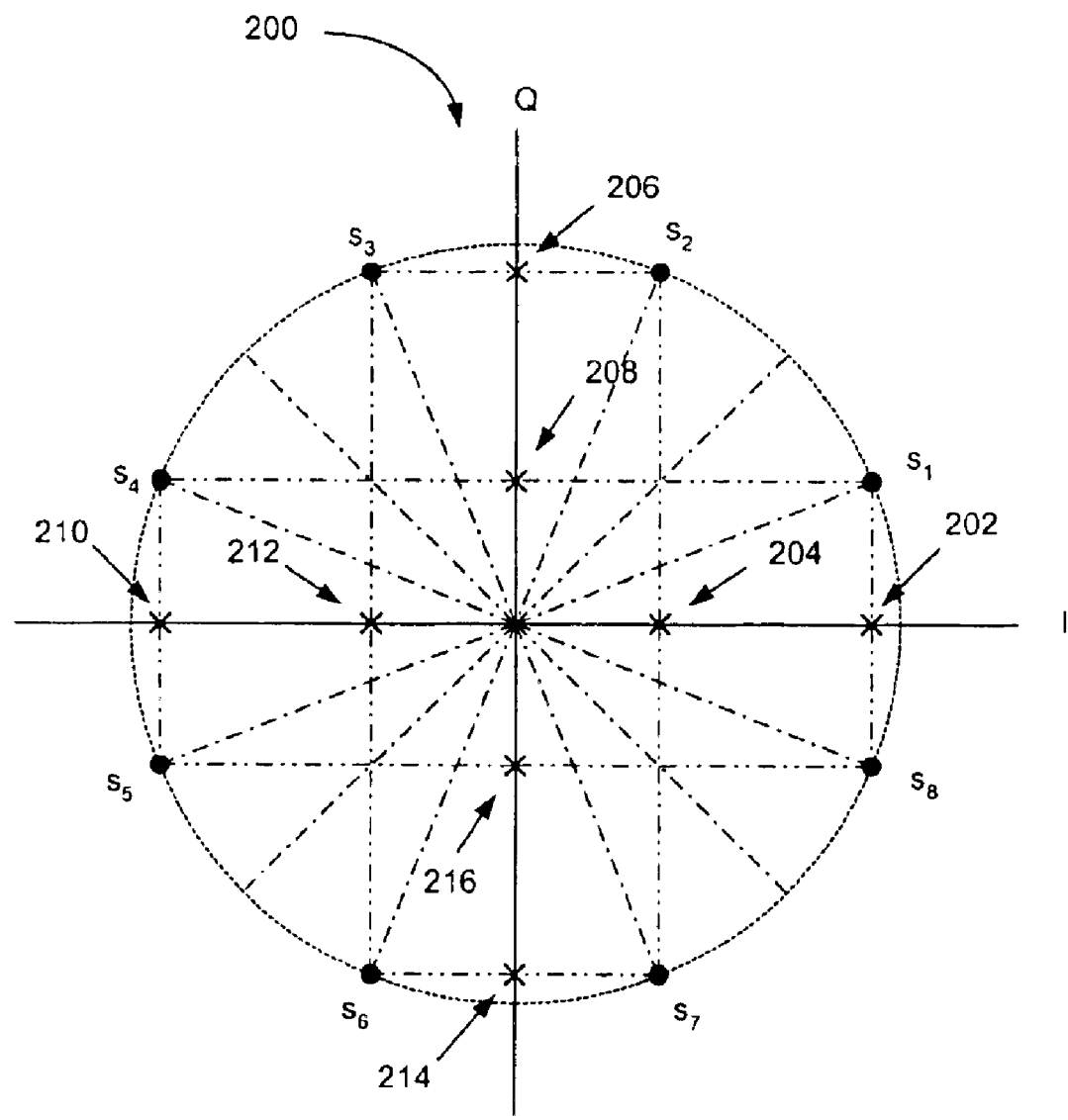
FIG. 2 illustrates an example of an 8-PSK symbol constellation.

FIG. 2 illustrates a particular 8-PSK symbol constellation. In FIG. 2, all eight possible symbols, $s_1, s_2, \ldots, s_8$, are situated on the unit circle, and are spaced from one another in 45° ($\pi/4$) increments.

A characteristic of this symbol constellation is that all the symbols are rotated relative to one of the I and Q axes by $\pm\pi/8$ radians. Therefore, in terms of in-phase (I) and out-of-phase (Q) components, each of these symbols can be expressed either as ($\pm\cos(\pi/8), \pm\sin(\pi/8)$) or as ($\pm\sin(\pi/8), \pm\cos(\pi/8)$). For example, the I component of symbols $s_1$ and $s_8$ is $\cos(\pi/8)$, as indicated by numeral 202 in FIG. 2; the I component of symbols $s_2$ and $s_7$ is $\sin(\pi/8)$, as indicated by numeral 204 in FIG. 2; the I component of symbols $s_3$ and $s_6$ is $-\sin(\pi/8)$, as indicated by numeral 212 in FIG. 2; the I component of symbols $s_4$ and $s_5$ is $-\cos(\pi/8)$, as indicated by numeral 210 in FIG. 2; the Q component of symbols $s_2$ and $s_3$ is $\cos(\pi/8)$, as indicated by numeral 206; the Q component of symbols $s_1$ and $s_4$ is $\sin(\pi/8)$, as indicated by numeral 208; the Q component of symbols $s_5$ and $s_8$ is $-\sin(\pi/8)$, as indicated by numeral 216; and the Q component of symbols $s_6$ and $s_7$ is $-\cos(\pi/8)$, as indicated by numeral 214.

An approximation which is accurate to 7 bits of resolution is that the factor $\cos(\pi/8)$ can be approximated by $15/16$, and $\sin(\pi/8)$ by $3/8$. Using these approximations, each of the symbols in FIG. 2 can be represented either as ($\pm 15/16, \pm 3/8$) or as ($\pm 3/8, \pm 15/16$).

C. Embodiments of Systems According to the Invention

An embodiment of a system for forming a metric for testing an 8-PSK symbol hypothesis is illustrated in FIG. 3A. A received symbol having in-phase (I) and quadrature (Q) components is input to the system. The component $r_I$ is identified with numeral 302, and the component $r_Q$ is identified with numeral 304. The component $r_I$ forms a multiplicand which is input to multiplier 308. The component $r_Q$ forms a multiplicand which is input to multiplier 310.

Multiplier 308 multiplies $r_I$ by a multiplier, and multiplier 310 multiplies $r_Q$ by a multiplier, each of which are selected from the values $\pm 15/16, \pm 3/8$ based on the particular symbol hypothesis, $s_i$, being tested. If $\pm 15/16$ is selected for $r_I$, then $\pm 3/8$ is selected for $r_Q$, and vice-versa. The value selected for $r_I$ is identified with numeral 306, and that for $r_Q$ is identified by numeral 312.

The resulting products from the multipliers are added by adder 314 to form a number 316 from which a metric for testing the hypothesis is derived. The metric may be the number 316 which results from adding the two products, or it may be derived from that number such as by multiplying the number by $2/\sigma^2$ for those applications that require it.

In one implementation, the number 316 is rounded or truncated to a desired or required level of precision before being input to a decoder.

A second embodiment of a system for forming a metric for testing an 8-PSK symbol hypothesis is illustrated in FIG. 3B. Again, a received symbol having in-phase (I) and quadrature (Q) components is input to the system. The component $r_I$ is identified with numeral 302, and the component $r_Q$ is identified with numeral 304. The component $r_I$ forms a multiplicand which is input to multiplier 308. The component $r_Q$ forms a multiplicand which is input to multiplier 310.

Multiplier 308 multiplies $r_I$ by a multiplier, and multiplier 310 multiplies $r_Q$ by a multiplier, each of which are selected from the values $\pm 15, \pm 6$ based on the particular symbol hypothesis, $s_i$, being tested. If $\pm 15$ is selected for $r_I$, then $\pm 6$ is selected for $r_Q$, and vice-versa. The value selected for $r_I$ is identified with numeral 318, and that for $r_Q$ is identified by numeral 320. Note that $\pm 15$ is derived from $\pm 15/16$ simply by multiplying the latter by 16, and that $\pm 6$ is derived from $\pm 3/8$ by again multiplying the latter by 16. To account for this, the rightmost bit in the multiplicands $r_I$ and $r_Q$ may be re-interpreted to be the $2^{-4}$ position rather than the $2^0$ position, thus in effect, dividing the multiplicands by 16 to counterbalance the multiplication of the multipliers by 16.

The resulting products from the multipliers are added by adder 314 to form a number 316 from which a metric for testing the hypothesis is derived. Again, the metric may be the number 316 which results from adding the two products, or it may be derived from that number such as by multiplying the number by $2/\sigma^2$ for those applications that require it.

In one implementation, the number 316 is rounded or truncated to a desired or required level of precision before being input to a decoder.

A third embodiment of a system for forming a metric for testing an 8-PSK symbol hypothesis is illustrated in FIG. 3C. A received symbol having in-phase (I) and quadrature (Q) components is input to the system. One or the other of $r_I$ or $r_Q$ forms a multiplicand 324 which is input to multiplier 308, and the other of $r_I$ or $r_Q$ forms a multiplicand 326 which is input to multiplier 310. If $r_I$ forms input 324, then $r_Q$ forms input 326. The selection of which component forms an input to which multiplier is determined based on the symbol hypothesis, $s_i$, being tested.

Multiplier 308 multiplies multiplicand 324 by a multiplier which is $\pm 3/8$. Multiplier 310 multiplies multiplicand 326 by a multiplier which is $\pm 15/16$. The multiplier selected for multiplicand 324 is identified with numeral 322, and that for multiplicand 326 is identified by numeral 328.

The resulting products from the multipliers are added by adder 314 to form a number 316 from which a metric for testing the hypothesis is derived. Again, the metric may be the number 316 which results from adding the two products, or it may be derived from that number such as by multiplying the number by $2/\sigma^2$ for those applications that require it.

In one implementation, the number 316 is rounded or truncated to a desired or required level of precision before being input to a decoder.

A fourth embodiment of a system for forming a metric for testing an 8-PSK symbol hypothesis is illustrated in FIG. 3D. A received symbol having in-phase (I) and quadrature (Q) components is input to the system. One or the other of $r_I$ or $r_Q$ forms a multiplicand 324 which is input to multiplier 308, and the other of $r_I$ or $r_Q$ forms a multiplicand 326 which is input to multiplier 310. If $r_I$ forms input 324, then $r_Q$ forms input 326. The selection of which component forms an input to which multiplier is determined based on the symbol hypothesis, $s_i$, being tested.

Multiplier 308 multiplies multiplicand 324 by a multiplier which is $\pm 6$. Multiplier 310 multiplies multiplicand 326 by a multiplier which is $\pm 15$. The multiplier selected for multiplicand 324 is identified with numeral 330, and that for multiplicand 326 is identified by numeral 332.

Note again that $\pm 15$ is derived from $\pm 15/16$ simply by multiplying the latter by 16, and that $\pm 6$ is derived from $\pm 3/8$ by again multiplying the latter by 16. To account for this, the rightmost bit in the multiplicands $r_I$ and $r_Q$ may be re-interpreted to be the $2^{-4}$ position rather than the $2^0$ position, thus in effect, dividing the multiplicands by 16 to counterbalance the multiplication of the multipliers by 16.

The resulting products from the multipliers are added by adder 314 to form a number 316 from which a metric for testing the hypothesis is derived. Again, the metric may be the number 316 which results from adding the two products, or it may be derived from that number such as by multiplying the number by $2/\sigma^2$ for those applications that require it.

In one implementation, the number 316 may be truncated or rounded to a desired or required level of precision before being input to a decoder.

Figure 4:
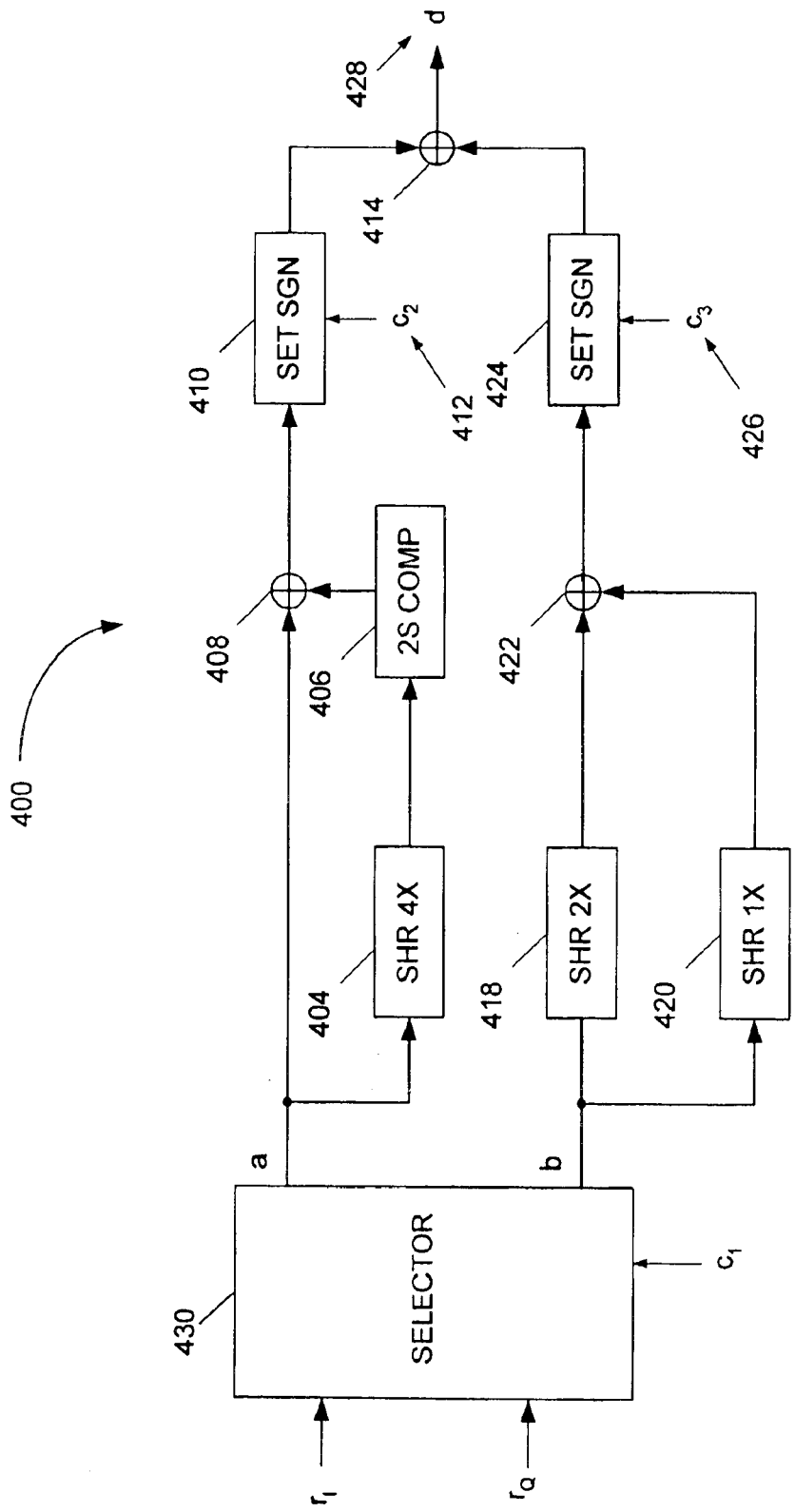
FIGS. 4 and 5 are block diagrams of implementations of a system according to the invention.

An implementation of the embodiment of FIG. 3C is illustrated in FIG. 4. This implementation takes advantage of the fact that $15/16$ can be re-expressed as $(1-1/16)$, and a multiplication by $15/16$ can therefore by performed by shifting the multiplicand four places to the right, inverting the result (such as by forming the twos complement thereof), and adding the inverted result to the unshifted multiplicand. This implementation also takes advantage of the fact that $3/8$ can be re-expressed as $(1/4+1/8)$, and that a multiplication by $3/8$ can therefore by performed by shifting the multiplicand two places to the right, shifting the multiplicand one place to the right, and then adding the two shifted multiplicands together.

As illustrated, the I and Q components of the received symbol r are input to selector 430. The selector 430 outputs two multiplicands "a" and "b". Responsive to control signal $c_1$, selector 430 either selects $r_I$ or $r_Q$ as multiplicand "a", and it selects either $r_Q$ or $r_I$ as multiplicand "b". If $r_I$ is selected to be multiplicand "a", then $r_Q$ is selected to be multiplicand "b", and vice-versa.

Multiplicand "a" is input to shifter 404, which shifts "a" four places to the right. Inverter 406 inverts the shifted version of "a", such as by forming the twos complement thereof. The output of inverter 406 is then added to multiplicand "a" by adder 408. The output of adder 408, a value representative of "a"$\times(1-1/16)$, is then input to logic 410 which selectively takes the twos complement of this value responsive to the control signal $c_2$.

The multiplicand "b" in FIG. 4 is input to shifter 418 and shifter 420. Shifter 418 outputs "b" shifted two places to the right, and shifter 420 outputs "b" shifted one place to the right. These two values are added by adder 422 which outputs a value representative of "b"$\times(1/4+1/8)$. Logic 424 selectively takes the twos complement of this value responsive to the control signal $c_3$.

The outputs of logic 410 and 424 are then input to adder 414, which adds the two together to produce output "d". A metric for testing whether the symbol r resulted from hypothesized symbol $s_i$ may then be set equal to or derived from "d". From FIG. 4, it may be seen that a metric may be formed using a discrete number of shifting, inversion, and addition operations for the multiplication steps.

The control signals $c_1$, $c_2$, and $c_3$ are determined based on the symbol hypothesis $s_i$ being tested. The following table shows the relationship between these control signals and the symbol hypothesis being tested:

| $s_i$ | $c_1$ | | $c_2$ | $c_3$ |
|---|---|---|---|---|
| | "a" | "b" | | |
| $s_1$ | $r_I$ | $r_Q$ | + | + |
| $s_2$ | $r_Q$ | $r_I$ | + | + |

-continued

| $s_i$ | $c_1$ | | $c_2$ | $c_3$ |
|---|---|---|---|---|
| | "a" | "b" | | |
| $s_3$ | $r_Q$ | $r_I$ | + | − |
| $s_4$ | $r_I$ | $r_Q$ | − | + |
| $s_5$ | $r_I$ | $r_Q$ | − | − |
| $s_6$ | $r_Q$ | $r_I$ | − | − |
| $s_7$ | $r_Q$ | $r_I$ | − | + |
| $s_8$ | $r_I$ | $r_Q$ | + | − |

Note that this implementation may be subject to rounding error due to the right shift operations. To account for this possibility, it may be desirable to pad each of the multiplicands on the right by 4 bits.

Figure 5:
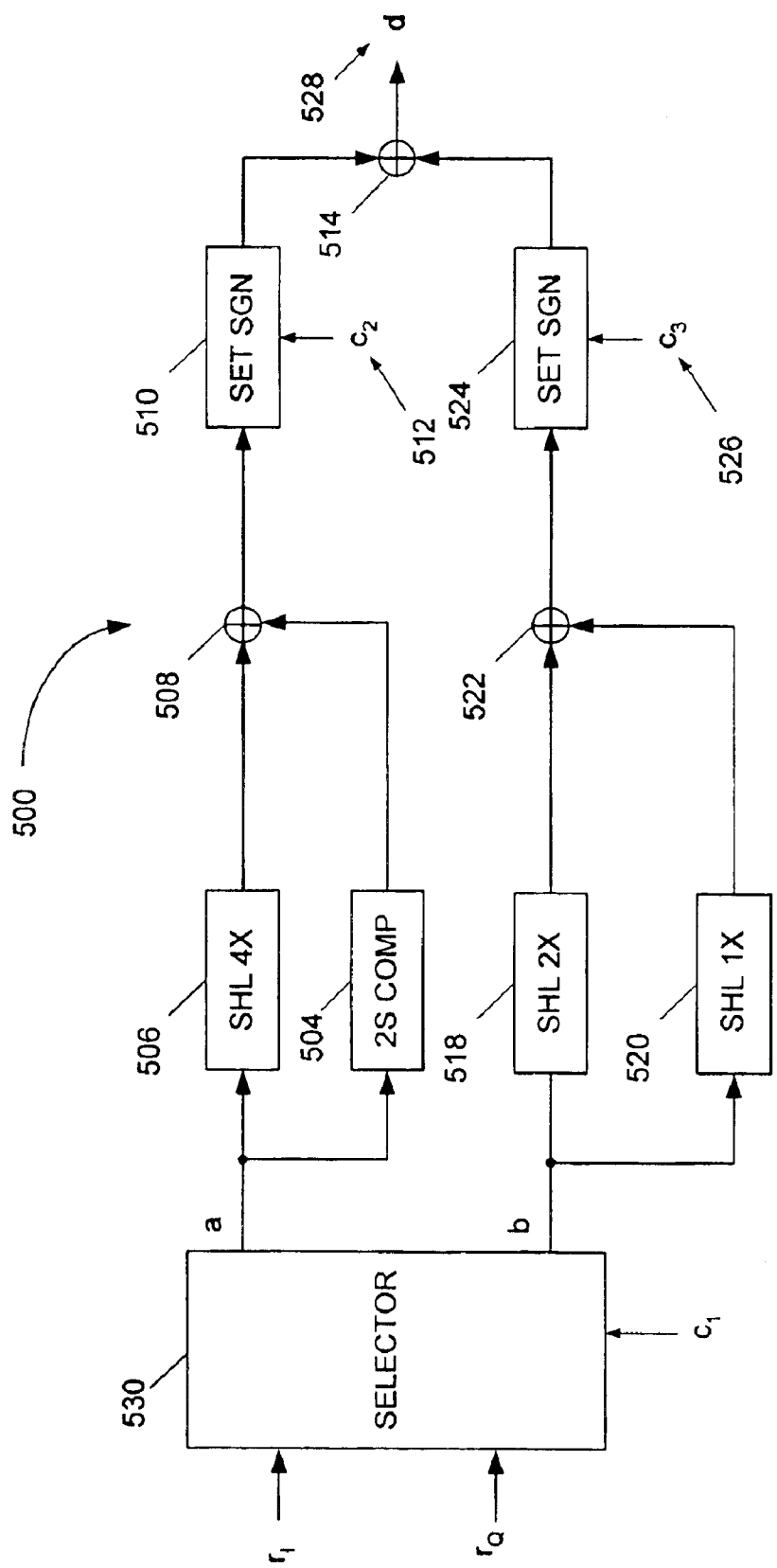

An implementation of the embodiment of FIG. 3D is illustrated in FIG. 5. This implementation takes advantage of the fact that 15 can be re-expressed as (16−1), and a multiplication by 15 can therefore by performed by shifting the multiplicand four places to the left, and adding the result to the inverted multiplicand. This implementation also takes advantage of the fact that 6 can be re-expressed as (4+2), and that a multiplication by 6 can therefore by performed by shifting the multiplicand two places to the left, shifting the multiplicand one place to the left, and then adding the two shifted multiplicands together.

As illustrated, the I and Q components of the received symbol r are input to selector 530. The selector 530 outputs two multiplicands "a" and "b". Responsive to control signal $c_1$, selector 530 either selects $r_I$ or $r_Q$ as multiplicand "a", and it selects either $r_Q$ or $r_I$ as multiplicand "b". If $r_I$ is selected to be multiplicand "a", then $r_Q$ is selected to be multiplicand "b", and vice-versa.

Multiplicand "a" is input to shifter 506, which shifts "a" four places to the left. It is also input to inverter 504, which inverts "a" such as by forming the twos complement thereof. The outputs of shifter 506 and inverter 504 are then added by adder 508. The output of adder 508, a value representative of "a"$\times(16-1)$, is then input to logic 510 which selectively flips the sign of this value responsive to the control signal $c_2$.

The multiplicand "b" in FIG. 5 is input to shifter 518 and shifter 520. Shifter 518 outputs "b" shifted two places to the left, and shifter 520 outputs "b" shifted one place to the left. The outputs of shifter 518 and shifter 520 are added by adder 522 which outputs a value representative of "b"$\times(4+2)$. Logic 524 selectively flips the sign of this value responsive to the control signal $c_3$.

The outputs of logic 510 and 524 are then input to adder 514, which adds the two together to produce output "d". A metric for testing whether the symbol r resulted from hypothesized symbol $s_i$ may then be set equal to or derived from "d". From FIG. 5, it may be seen that again the metric may be computed using no more than a prescribed number of shifting, inversion, and addition operations.

The control signals $c_1$, $c_2$, and $c_3$ are determined based on the symbol hypothesis $s_i$ being tested. The table set forth previously shows the relationship between these control signals and the symbol hypothesis being tested.

Note that this implementation, unlike the previous implementation, is not subject to rounding error since no right shift operations are involved. Moreover, the multiplication of each of the multipliers by the factor 16 is counterbalanced by re-interpreting the rightmost bit in each of the multiplicands to be the $2^{-4}$ rather than the $2^0$ position, thus in effect dividing each of the multiplicands by 16. Note also that it is unnecessary to add padding bits to either the right or the left of the multiplicands.

It should be appreciated that, for purposes of this disclosure, the terms "logic", "selector", "shifter", "inverter" and "adder" encompass hardware, including but not limited to digital or analog circuitry, integrated circuits, chips, PLAs, ASICs, etc., software, such as code running on a general purpose DSP, or a combination of hardware and software, and the systems of any of FIGS. 3A–3D, 4, and 5 may be implemented as hardware, software, or a combination of hardware and software.

Figure 8A:
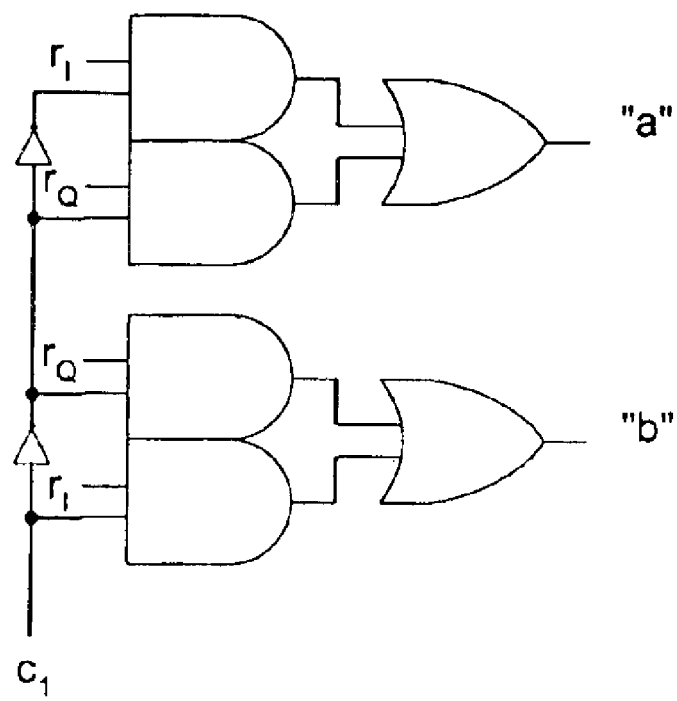
FIGS. 8A–8B illustrate example implementations of components of the systems of FIGS. 4–5.
Figure 8B:
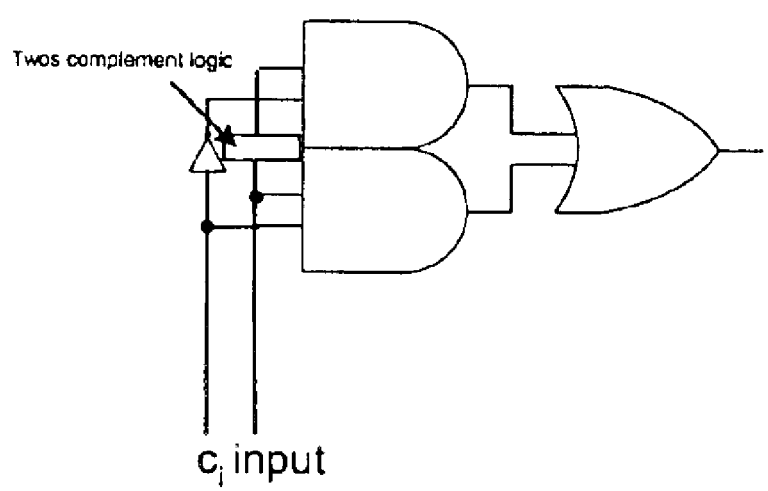

In one implementation example, the selectors, shifters, inverters, and adders of FIGS. 4 and 5 are implemented with conventional digital logic. An example implementation of selector 430 and 530 is illustrated in FIG. 8A. An example implementation of logic 410, 424, 510, and 526 is illustrated in FIG. 8B.

D. Methods According to the Invention

Figure 6A:
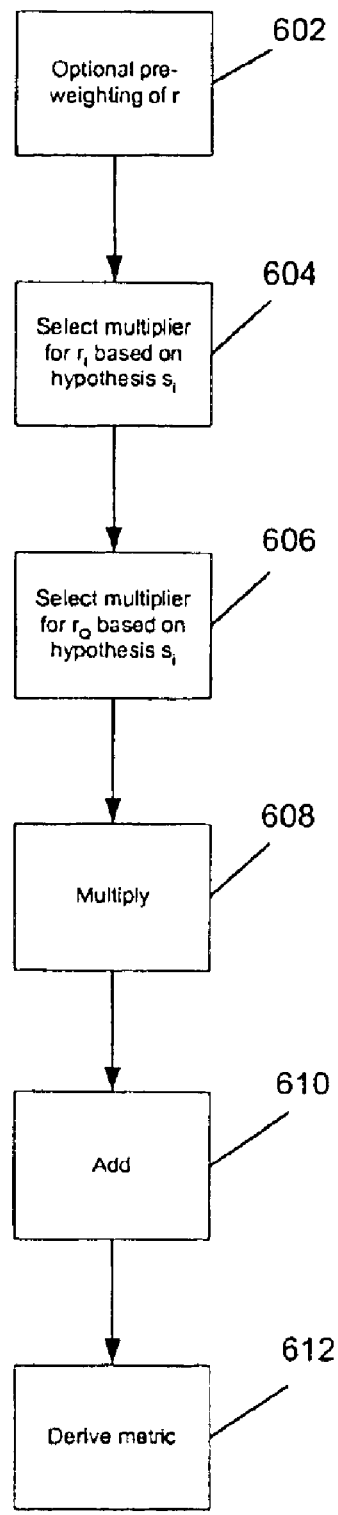
FIGS. 6A–6B are flowcharts of embodiments of methods according to the invention.

A first embodiment of a method according to the invention is illustrated in FIG. 6A. As illustrated, the method begins with optional step 602 in which both the I and Q components of the received symbol r are pre-weighted by $2/\sigma^2$ in accordance with expressions (3) or (10) above. This step is optional, and need not be performed for those applications in which the metric represented by expression (11) is adequate for performing hypothesis testing. Even in those applications in which the metric of expressions (3) or (10) is required for hypothesis testing, this step need not be performed if the multiplication by $2/\sigma^2$ is performed in step 612. In those applications which require it, it is preferred that the factor $2/\sigma^2$ be accounted for either by pre-weighting the components of r with the factor, or post-weighting rs*+r*s with this factor, and not by pre-weighting the components of s with this factor. Pre-weighting of the components of s by this factor is not preferred because that would not allow use of the simplified implementations of FIGS. 4 and 5 in which the multiplications to account for s can be performed through a discrete set of shifting, inverting, and adding operations. In those applications in which r is pre-weighted with this factor, the resulting product may then be quantized to a desired level of resolution.

Optional step 602 is followed by step 604, in which a multiplier for $r_I$ is selected based on the symbol hypothesis $s_i$ being tested. As discussed, the multiplier is preferably derived from either $\pm 15/16$ or $\pm 3/8$. Step 604 is followed by or performed in parallel with step 606, in which a multiplier for $r_Q$ is also selected based on the symbol hypothesis $s_i$ being tested. Again, the multiplier is derived from either $\pm 15/16$ or $\pm 3/8$, provided, however, that this multiplier is derived from $\pm 15/16$ if that for $r_I$ is derived from $\pm 3/8$, and vice-versa. The multipliers in these steps may either be set equal to $\pm 15/16$ or $\pm 3/8$ or may be derived from one of these values such as through multiplication or division by a common factor applied to all the values One example discussed earlier is where the multipliers are set equal to either $\pm 15$ or $\pm 6$. Depending on the multipliers chosen, it may be necessary to re-interpret the rightmost bit of each of the multiplicands to be the $2^{-4}$ position rather than the $2^0$ position.

Step 604 is followed by step 608, in which the components $r_I$ and $r_Q$ are multiplied by their respective multipliers. Step 608 is followed by step 610 in which the resulting products are added.

Step 610 is followed by step 612, in which a metric is derived from the sum from step 610. As discussed, depending on the application, the metric may be set equal to this sum or may be derived from it, such as through multiplication by the factor $2/\sigma^2$.

Figure 6B:
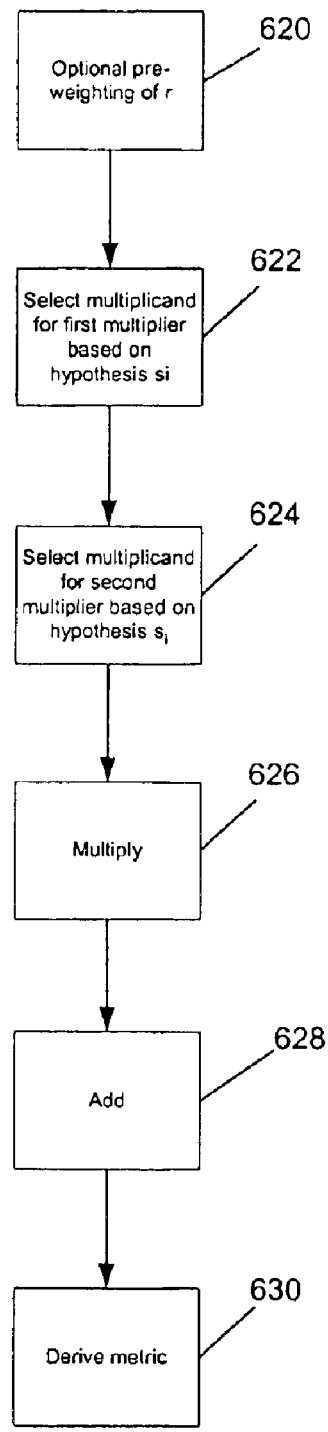

A second embodiment of a method according to the invention is illustrated in FIG. 6B. As illustrated, the method begins with optional step 620 in which both the I and Q components of the received symbol r are pre-weighted by $2/\sigma^2$ in accordance with expressions (3) or (10) above. This step is optional for the same reasons discussed previously in relation to the embodiment of FIG. 6A.

Optional step 620 is followed by step 622, in which a multiplicand is selected for a first multiplier based on the symbol hypothesis $s_i$ being tested. The multiplicand may either be $r_I$ or $r_Q$, and the first multiplier is preferably derived from either $\pm 15/16$ or $\pm 3/8$. Step 622 is followed by or performed in parallel with step 624, in which a multiplicand is selected for a second multiplier based on the symbol hypothesis $s_i$ being tested. Again, the multiplicand may either be $r_I$ or $r_Q$, provided, however, that the multiplicand for step 624 should be $r_Q$ if that for step 622 is selected to be $r_I$, and vice-versa. Also, the second multiplier should be derived from $\pm 15/16$ if the first multiplier is derived from $\pm 3/8$, and vice-versa. Again, the multipliers in these steps may either be set equal to $\pm 15/16$ or $\pm 3/8$ or may be derived from one of these values such as through multiplication or division by a common factor applied to all the values. Again, depending on the multipliers chosen, it may be necessary to re-interpret the rightmost bit of the multiplicands to be the $2^{-4}$ position rather than the $2^0$ position.

Step 624 is followed by step 626, in which the multiplicands $r_I$ and $r_Q$ are multiplied by their respective multipliers. Step 626 is followed by step 628 in which the resulting products are added.

Step 628 is followed by step 630, in which a metric is derived from the sum from step 628. As discussed, depending on the application, the metric may be set equal to this sum or may be derived from it, such as through multiplication by the factor $2/\sigma^2$.

It should be appreciated that any of the foregoing methods may be tangibly embodied as a series of instructions stored on a processor readable medium or memory including, without limitation, RAM, ROM, PROM, EPROM, EEPROM, hard disk, floppy disk, CD-ROM, DVD, tape, flash memory, etc. A system may also be formed comprising the processor readable medium coupled to a processor configured to access and execute the instructions stored on the processor readable medium.

Figure 7:
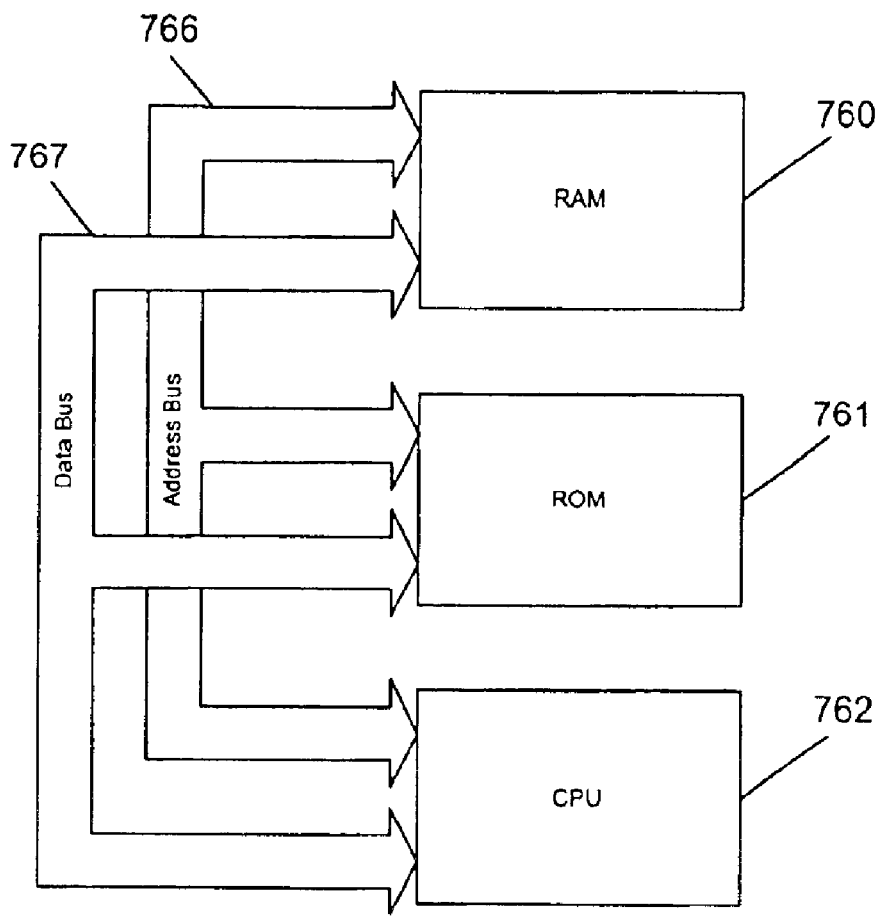
FIG. 7 is a block diagram of a processor-based system.

FIG. 7 illustrates one embodiment of a system for testing an MPSK symbol hypothesis according to the subject invention. As illustrated, the system includes CPU 762 which can be any processor, including but not limited to a microprocessor, capable of executing software instructions stored in a memory, storage device or medium accessible or readable by the processor. CPU 762 is coupled to one or more memories, storage devices or media, including by way of illustration and not limitation, RAM (Random Access Memory) 760, and ROM (Read Only Memory) 761, through Address Bus 766 and Data Bus 767. In this embodiment, RAM 760 functions as volatile temporary storage, and ROM 761 functions and non-volatile storage.

In one configuration, software, comprising a series of instructions embodying any of the methods according to the invention, is stored in ROM 751. When the system is booted up, the software is loaded into RAM 760. A section of RAM 760 may also be allocated to the storage of data. CPU 762 accesses this software as stored in RAM 760, and executes it to compute a metric for testing a symbol hypothesis.

Any of the methods of the invention may be embodied as hardware, software, or a combination of hardware and software. The hardware may comprise dedicated analog or digital circuitry, integrated circuits, ASICs, PLAs, or the like. The software may comprise code running on a general purpose DSP.

E. Extensions to MPSK

It should be apparent to one of skill in the art from a reading of this disclosure that the principles of the foregoing embodiments can readily be extended to the MPSK case. Consider that an MPSK symbol constellation beyond 8-PSK can always be oriented so that 8 of the symbols thereof coincide with the 8 symbols on the constellation illustrated in FIG. 2, and that hypothesis testing for these symbols can be performed through direct application of the foregoing embodiments. What's more, MPSK constellations of lower order than 8-PSK, namely QPSK and BPSK, may be interpreted as subsets of the 8-PSK constellation.

One of skill in the art will appreciate that the invention may also be readily extended to the other symbols in the constellation although with different multipliers. In particular, the I and Q components of these symbols may be approximated to a desired level of resolution with fractional values, and the multipliers may be set equal to or derived from these fractional values. Preferably, the multipliers are selected so that the multiplications can be performed through a discrete series of addition, shifting, and twos complement operations.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A system for testing a hypothesis that a symbol r resulted from transmitting an MPSK symbol s over a communications channel, the symbol r being a quadrature symbol having an in-phase component $r_I$ and a quadrature component $r_Q$, comprising:
   first logic for multiplying a first multiplicand which is either $r_I$ or $r_Q$ by a first multiplier derived from either $\pm 15/16$ or $\pm 3/8$ resulting in a first product;
   second logic for multiplying a second multiplicand which is either $r_I$ or $r_Q$ by a second multiplier derived from either $\pm 3/8$ or $\pm 15/16$ resulting in a second product; and
   third logic for deriving a metric for testing the hypothesis from the first and second products,
   wherein the second multiplicand is $r_Q$ if the first multiplicand is $r_I$, and the second multiplicand is $r_I$ if the first multiplicand is $r_Q$, and
   wherein the second multiplier is derived from $\pm 15/16$ if the first multiplier is derived from $\pm 3/8$ and the second multiplier is derived from $\pm 3/8$ if the first multiplier is derived from $\pm 15/16$.

2. The system of claim 1 wherein the first logic selects the first multiplier based on the hypothesized symbol s.

3. The system of claim 2 wherein the second logic selects the second multiplier based on the hypothesized symbol s.

4. The system of claim 1 wherein the first logic selects the first multiplicand based on the hypothesized symbol s.

5. The system of claim 4 wherein the second logic selects the second multiplicand based on the hypothesized symbol s.

6. The system of claim 1 wherein the first and second multipliers are both equal to either $\pm 15/16$ or $\pm 3/8$.

7. The system of claim 1 wherein the first and second multipliers are both equal to either $\pm 6$ or $\pm 15$.

8. The system of claim 1 wherein the first logic further comprises:
   a selector for selecting either $r_I$ or $r_Q$ as the first multiplicand based on the hypothesized symbol s;
   a shifter for shifting the first multiplicand four places to the right;
   first twos complement logic for determining the twos complement of the first multiplicand;
   an adder for adding the shifted and twos complemented first multiplicands; and
   second twos complement logic for selectively determining the twos complement of the added shifted and twos complemented first multiplicands based on the hypothesized symbol s.

9. The system of claim 8 wherein the second logic further comprises:
   a selector for selecting either $r_I$ or $r_Q$ as the second multiplicand based on the hypothesized symbol s;
   a first shifter for shifting the second multiplicand two places to the right;
   a second shifter for shifting the second multiplicand one place to the right;
   an adder for adding the shifted second multiplicands; and
   third twos complement logic for selectively determining the twos complement of the added shifted second multiplicands based on the hypothesized symbol s.

10. The system of claim 1 wherein the first logic comprises:
    a shifter for shifting the first multiplicand four places to the left;
    first twos complement logic for determining the twos complement of the first multiplicand;
    an adder for adder the shifted and twos complemented first multiplicands; and
    second twos complement logic for selectively determining the twos complement of the added shifted and twos complemented first multiplicands based on the hypothesized symbol s.

11. The system of claim 10 wherein the second logic comprises:
    a first shifter for shifting the second multiplicand two places to the left;
    a second shifter for shifting the second multiplicand one place to the left;
    an adder for adding the shifted second multiplicands; and
    third twos complement logic for selectively determining the twos complement of the added shifted second multiplicands based on the hypothesized symbol s.

12. The system of claim 1 further comprising logic for pre-weighting $r_I$ and $r_Q$ with a weighting factor representative of $2/\sigma^2$, where $\sigma^2$ is the variance of the noise introduced through transmission over the communications channel.

13. The system of claim 1 wherein the third logic is configured to derive the metric by weighting a sum of the two products with a weighting factor representative of $2/\sigma^2$, where $\sigma^2$ is the variance of the noise introduced through transmission over the communications channel.

14. The system of claim 1 wherein the third logic is configured to derive the metric by rounding or truncating a sum of the two products to a desired or required level of precision.

15. The system of claim 1 in combination with a decoder.

16. The combination of claim 15 wherein the decoder is a trellis decoder.

17. The combination of claim 15 wherein the decoder is a Viterbi decoder.

18. The combination of claim 15 wherein the decoder is a MAP decoder.

19. The combination of claim 15 wherein the decoder is a log-MAP decoder.

20. The combination of claim 15 wherein the decoder is a MAX-log-MAP decoder.

21. The combination of claim 15 implemented as an integrated circuit chip.

22. The system of claim 1 wherein the following table provides the permissible combinations of multipliers and multiplicands:

| First multiplier | Second multiplier | First multiplicand | Second multiplicand |
|---|---|---|---|
| $r_I$ | $r_Q$ | 15/16 or derivative | 3/8 or derivative |
| $r_I$ | $r_Q$ | 3/8 or derivative | 15/16 or derivative |
| $r_I$ | $r_Q$ | −3/8 or derivative | 15/16 or derivative |
| $r_I$ | $r_Q$ | −15/16 or derivative | 3/8 or derivative |
| $r_I$ | $r_Q$ | −15/16 or derivative | −3/8 or derivative |
| $r_I$ | $r_Q$ | −3/8 or derivative | −15/16 or derivative |
| $r_I$ | $r_Q$ | 3/8 or derivative | −15/16 or derivative |
| $r_I$ | $r_Q$ | 15/16 or derivative | −3/8 or derivative |
| $r_Q$ | $r_I$ | 3/8 or derivative | 15/16 or derivative |
| $r_Q$ | $r_I$ | 15/16 or derivative | 3/8 or derivative |
| $r_Q$ | $r_I$ | 15/16 or derivative | −3/8 or derivative |
| $r_Q$ | $r_I$ | 3/8 or derivative | −15/16 or derivative |
| $r_Q$ | $r_I$ | −3/8 or derivative | −15/16 or derivative |
| $r_Q$ | $r_I$ | −15/16 or derivative | −3/8 or derivative |
| $r_Q$ | $r_I$ | −15/16 or derivative | 3/8 or derivative |
| $r_Q$ | $r_I$ | 3/8 or derivative | 15/16 or derivative. |

23. A system for testing a hypothesis that a symbol r resulted from transmitting an MPSK symbol s over a communications channel, the symbol r being a quadrature symbol having an in-phase component $r_I$ and a quadrature component $r_Q$, and the symbol s being a quadrature symbol having an in-phase component $s_I$ and a quadrature component $s_Q$ and selected from M possible MPSK symbols, M≧8, comprising:

first means for multiplying a first multiplicand which is either $r_I$ or $r_Q$ by a first multiplier derived from either ±cos(π/8) or ±sin(π/8) resulting in a first product;

second means for multiplying a second multiplicand which is either $r_I$ or $r_Q$ by a second multiplier derived either ±sin(π/8) or ±cos(π/8) resulting in a second product, wherein the first multiplicand is $r_I$ if the second multiplicand is $r_Q$, the first multiplicand is $r_Q$ if the second multiplicand is $r_I$, the first multiplier is derived from ±cos(π/8) if the second multiplier is derived from ±sin(π/8), the first multiplier is derived from ±sin(π/8) if the second multiplier is derived from ±cos(π/8), and 8 of the possible MPSK symbols are of the form {±cos(π/8), ±sin(π/8)} or {±sin(π/8), ±cos(π/8)}, thus resulting in computational efficiency given that two absolute values, cos(π/8) and sin(π/8), are common to each of the 8 possible symbols; and third means for deriving a metric for testing the hypothesis from the first and second products.

24. A system for testing a hypothesis that a symbol r resulted from transmitting an MPSK symbol s over a communications channel, the symbol r being a quadrature symbol having an in-phase component $r_I$ and a quadrature component $r_Q$, and the symbol s being a quadrature symbol having an in-phase component $s_I$ and a quadrature component $s_Q$ and selected from M possible MPSK symbols, M≧8, comprising:

first logic for multiplying a first multiplicand which is either $r_I$ or $r_Q$ by a first multiplier derived from either ±cos(π/8) or ±sin(π/8) resulting in a first product;

second logic for multiplying a second multiplicand which is either $r_I$ or $r_Q$ by a second multiplier derived from either ±sin(π/8) or ±cos(π/8) resulting in a second product, wherein the first multiplicand is $r_I$ if the second multiplicand is $r_Q$, the first multiplicand is $r_Q$ if the second multiplicand is $r_I$, the first multiplier is derived from ±cos(π/8) if the second multiplier is derived from ±sin(π/8), the first multiplier is derived from ±sin(π/8) if the second multiplier is derived from ±cos(π/8), and all M of the possible MPSK symbols are of the form {±cos(π/8), ±sin(π/8)} or {±sin(π/8), ±cos(π/8)}, thus resulting in computational efficiency given that two absolute values, cos(π/8) and sin(π/8), are common to each of the possible symbols; and third logic for deriving a metric for testing the hypothesis from the first and second products.

25. A method for testing a hypothesis that a symbol r resulted from transmitting an MPSK symbol s over a communications channel, the symbol r being a quadrature symbol having an in-phase component $r_I$ and a quadrature component $r_Q$, comprising:

multiplying a first multiplicand which is either $r_I$ or $r_Q$ by a first multiplier derived from either ±15/16 or ±3/8 resulting in a first product;

multiplying a second multiplicand which is either $r_I$ or $r_Q$ by a second multiplier derived from either ±3/8 or ±15/16 resulting in a second product; and deriving a metric for testing the hypothesis from the first and second products, wherein the second multiplicand is $r_Q$ if the first multiplicand is $r_I$, and the second multiplicand is $r_I$ if the first multiplicand is $r_Q$, and wherein the second multiplier is derived from ±15/16 if the first multiplier is derived from ±3/8 and the second multiplier is derived from ±3/8 if the first multiplier is derived from ±15/16.

26. The method of claim 25 further comprising selecting the first multiplier based on the hypothesized symbol s.

27. The method of claim 26 further comprising selecting the second multiplier based on the hypothesized symbol s.

28. The method of claim 25 further comprising selecting the first multiplicand based on the hypothesized symbol s.

29. The method of claim 28 further comprising selecting the second multiplicand based on the hypothesized symbol s.

30. The method of claim 25 wherein the first and second multipliers are both equal to either ±15/16 or ±3/8.

31. The method of claim 25 wherein the first and second multipliers are both equal to either ±6 or ±15.

32. The method of claim 25 further comprising:

selecting either $r_I$ or $r_Q$ as the first multiplicand based on the hypothesized symbol s;

shifting the first multiplicand four places to the right;

determining the twos complement of the first multiplicand;

adding the shifted and twos complemented first multiplicands; and selectively determining the twos complement of the added shifted and twos complemented first multiplicands based on the hypothesized symbol s.

33. The method of claim 32 further comprising:

selecting either $r_I$ or $r_Q$ as the second multiplicand based on the hypothesized symbol s;

shifting the second multiplicand two places to the right;

shifting the second multiplicand one place to the right;

adding the shifted second multiplicands; and selectively determining the twos complement of the added shifted second multiplicands based on the hypothesized symbol s.

34. The method of claim 25 further comprising:

interpreting the rightmost bit of the first multiplicand as a $2^{-4}$ position;

shifting the first multiplicand four places to the left;

determining the twos complement of the first multiplicand;

adding the shifted and twos complemented first multiplicands; and selectively determining the twos complement of the added shifted and twos complemented first multiplicands based on the hypothesized symbol s.

35. The method of claim 34 further comprising:

interpreting the rightmost bit of the second multiplicand as a $2^{-4}$ position;

shifting the second multiplicand two places to the left;

shifting the second multiplicand one place to the left;

adding the shifted second multiplicands; and selectively determining the twos complement of the added shifted second multiplicands based on the hypothesized symbol s.

36. The method of claim 25 further comprising pre-weighting $r_I$ and $r_Q$ with a weighting factor representative of $2/\sigma^2$, where $\sigma^2$ is the variance of the noise introduced through transmission over the communications channel.

37. The method of claim 25 further comprising deriving the metric by weighting a sum of the first and second products with a weighting factor representative of $2/\sigma^2$, where $\sigma^2$ is the variance of the noise introduced through transmission over the communications channel.

38. The method of claim 37 further comprising deriving the metric by quantizing the weighted sum of the first and second products.

39. The method of claim 25 wherein the following table provides the permissible combinations of multipliers and multiplicands:

| First multiplier | Second multiplier | First multiplicand | Second multiplicand |
|---|---|---|---|
| $r_I$ | $r_Q$ | 15/16 or derivative | 3/8 or derivative |
| $r_I$ | $r_Q$ | 3/8 or derivative | 15/16 or derivative |
| $r_I$ | $r_Q$ | −3/8 or derivative | 15/16 or derivative |
| $r_I$ | $r_Q$ | −15/16 or derivative | 3/8 or derivative |
| $r_I$ | $r_Q$ | −15/16 or derivative | −3/8 or derivative |
| $r_I$ | $r_Q$ | −3/8 or derivative | −15/16 or derivative |
| $r_I$ | $r_Q$ | 3/8 or derivative | −15/16 or derivative |
| $r_I$ | $r_Q$ | 15/16 or derivative | −3/8 or derivative |
| $r_Q$ | $r_I$ | 3/8 or derivative | 15/16 or derivative |
| $r_Q$ | $r_I$ | 15/16 or derivative | 3/8 or derivative |
| $r_Q$ | $r_I$ | 15/16 or derivative | −3/8 or derivative |
| $r_Q$ | $r_I$ | 3/8 or derivative | −15/16 or derivative |
| $r_Q$ | $r_I$ | −3/8 or derivative | −15/16 or derivative |
| $r_Q$ | $r_I$ | −15/16 or derivative | −3/8 or derivative |
| $r_Q$ | $r_I$ | −15/16 or derivative | 3/8 or derivative |
| $r_Q$ | $r_I$ | −3/8 or derivative | 15/16 or derivative. |

40. A processor readable medium on which is stored a series of instructions tangibly embodying the methods of claims 25, 32, 33, 34, or 35.

41. A system comprising the processor readable medium of claim 40 and a processor configured to access and execute the series of instructions stored on the medium.

42. A method for testing a hypothesis that a symbol r resulted from transmitting an MPSK symbol s over a communications channel, the symbol r being a quadrature symbol having an in-phase component $r_I$ and a quadrature component $r_Q$, and the symbol s being a quadrature symbol having an in-phase component $s_I$ and a quadrature component $s_Q$ and selected from M possible MPSK symbols, $M \geq 8$, comprising:

a step for multiplying a first multiplicand which is either $r_I$ or $r_Q$ by a first multiplier derived from either $\pm\cos(\pi/8)$ or $\pm\sin(\pi/8)$ resulting in a first product;

a step for multiplying a second multiplicand which is either $r_I$ or $r_Q$ by a second multiplier derived from either $\pm\sin(\pi/8)$ or $\pm\cos(\pi/8)$ resulting in a second product, wherein the first multiplicand is $r_I$ if the second multiplicand is $r_Q$, the first multiplicand is $r_Q$ if the second multiplicand is $r_I$, the first multiplier is derived from $\pm\cos(\pi/8)$ if the second multiplier is derived from $\pm\sin(\pi/8)$, the first multiplier is derived from $\pm\sin(\pi/8)$ if the second multiplier is derived from $\pm\cos(\pi/8)$, and 8 of the possible MPSK symbols are of the form $\{\pm\cos(\pi/8), \pm\sin(\pi/8)\}$ or $\{\pm\sin(\pi/8), \pm\cos(\pi/8)\}$, thus resulting in computational efficiency given that two absolute values, $\cos(\pi/8)$ and $\sin(\pi/8)$, are common to each of the 8 possible symbols; and a step for deriving from the first and second products a metric for testing the hypothesis.

43. A method for testing a hypothesis that a symbol r resulted from transmitting an MPSK symbol s over a communications channel, the symbol r being a quadrature symbol having an in-phase component $r_I$ and a quadrature component $r_Q$, and the symbol s being a quadrature symbol, having an in-phase component $s_I$ and a quadrature component $s_Q$ and selected from M possible MPSK symbols, $M \geq 8$, comprising:

multiplying a first multiplicand which is either $r_I$ or $r_Q$ by a first multiplier derived from either $\pm\cos(\pi/8)$ or $\pm\sin(\pi/8)$ resulting in a first product;

multiplying $r_Q$ by a second multiplier derived from either $\pm\sin(\pi/8)$ or $\pm\cos(\pi/8)$ resulting in a second product, wherein the first multiplicand is $r_I$ if the second multiplicand is $r_Q$, the first multiplicand is $r_Q$ if the second multiplicand is $r_I$, the first multiplier is derived from $\pm\cos(\pi/8)$ if the second multiplier is derived from $\pm\sin(\pi/8)$, the first multiplier is derived from $\pm\sin(\pi/8)$ if the second multiplier is derived from $\pm\cos(\pi/8)$, and all M of the possible MPSK symbols are of the form $\{\pm\cos(\pi/8), \pm\sin(\pi/8)\}$ or $\{\pm\sin(\pi/8), \pm\cos(\pi/8)\}$, thus resulting in computational efficiency given that two absolute values, $\cos(\pi/8)$ and $\sin(\pi/8)$, are common to each of the possible symbols; and deriving from the first and second products a metric for testing the hypothesis.

* * * * *